Figure 1:
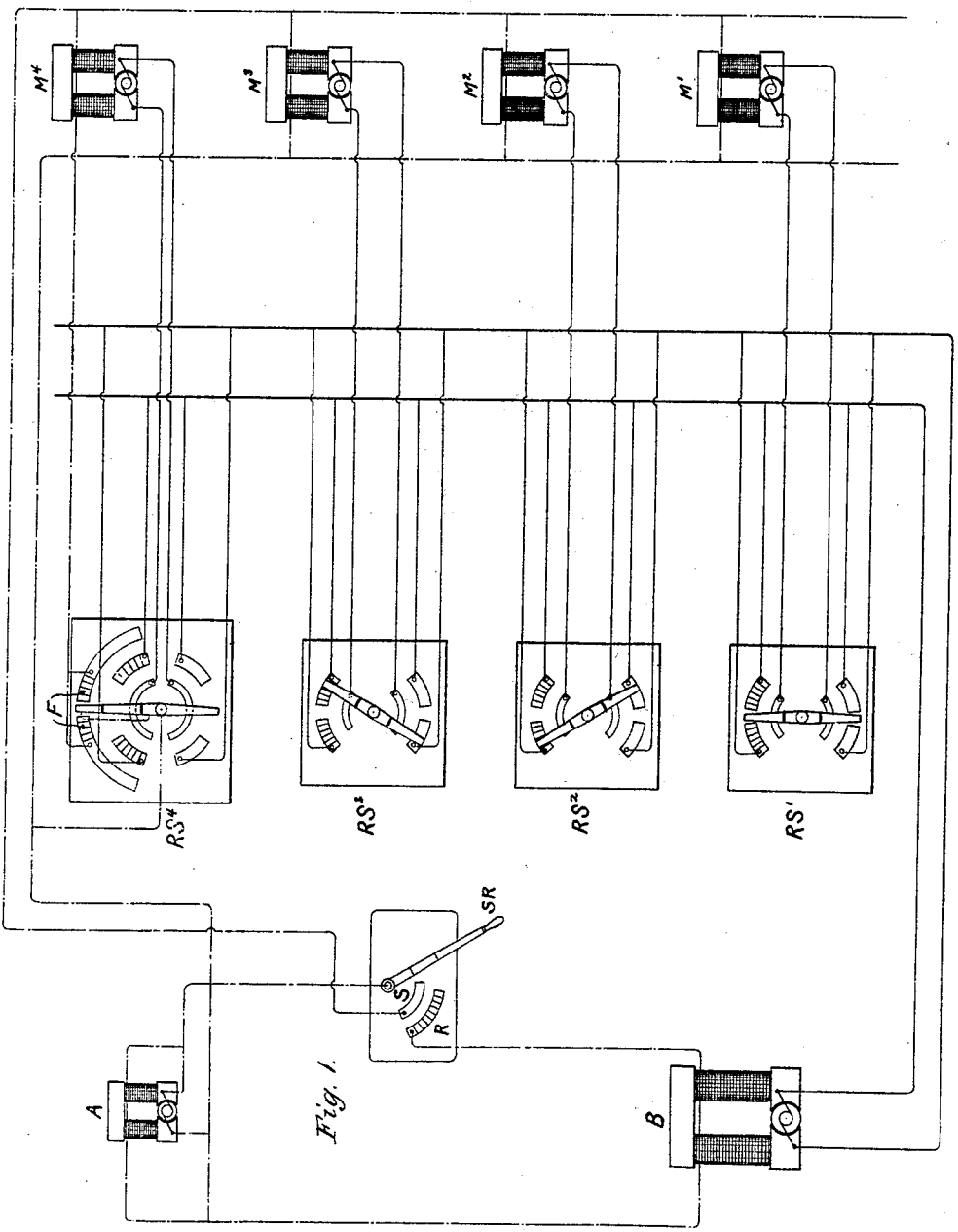

(No Model.)  3 Sheets—Sheet 1.

J. S. BANCROFT.
METHOD OF OPERATING ELECTRIC MOTORS.

No. 520,748. Patented May 29, 1894.

WITNESSES.

INVENTOR (No Model.) 3 Sheets—Sheet 2.

J. S. BANCROFT.
METHOD OF OPERATING ELECTRIC MOTORS.

No. 520,748. Patented May 29, 1894.

WITNESSES:
E. R. Harper
N. H. Wolf

INVENTOR
J. Sellers Bancroft (No Model.) 3 Sheets—Sheet 3.
J. S. BANCROFT.
METHOD OF OPERATING ELECTRIC MOTORS.
No. 520,748. Patented May 29, 1894.

WITNESSES:
E. N. Harper
T. W. N. Wolf

INVENTOR
J. Sellers Bancroft

United States Patent Office.

JOHN SELLERS BANCROFT, OF PHILADELPHIA, PENNSYLVANIA, ASSIGNOR TO THE WILLIAM SELLERS & COMPANY, INCORPORATED, OF SAME PLACE.

METHOD OF OPERATING ELECTRIC MOTORS.

SPECIFICATION forming part of Letters Patent No. 520,748, dated May 29, 1894.

Application filed December 10, 1892. Serial No. 454,761. (No model.)

*To all whom it may concern:*

Be it known that I, JOHN SELLERS BANCROFT, of the city and county of Philadelphia and State of Pennsylvania, have invented certain new and useful Improvements in Methods of Operating Electric Motors, of which improvements the following is a specification.

Where several electric motors, receiving their current from a common source of supply, are to be operated from one point by one operator, it has hitherto been customary to use series wound motors, and to employ rheostats for admitting the current in sufficiently limited quantity for the purpose of starting, the speed of rotation of the motor being determined by the resistance of the load, or by choking the current through a rheostat, a large part of the energy of the current being wasted in heating this rheostat. For many purposes it is desirable to have the motors run at comparatively slow speeds for considerable time, in which case the electric energy wasted through the rheostat is very considerable and the temperature becomes so high that there is great danger of destroying the rheostat.

For purposes where it may be desirable to operate the motors at slow speed for considerable time, the shunt form of motor is preferable, and by shunt motor, I mean, a motor having its field partially or wholly energized by a current that does not pass through the armature coils, and that may be supplied from a different source from that which supplies the armature current, by changing the connection on the ordinary commercial shunt motor, the field coils receiving a current from a source of constant potential and the armature being supplied by a current the potential of which may be varied, so that as the potential is lowered the speed of the motor is reduced, without diminishing its torque for any given load. This has previous to my present invention, required that the armature of each motor should be supplied with current by its own special generator, but when several motors were required to be operated in one group, the expense of these special generators has been almost prohibitory.

An object of my present invention is to provide a means of operating the armatures of two or more motors from one generator.

A further object is to provide means whereby any of the motors may be started or stopped or reversed without interfering with the running of others in the group.

A further object is to provide means for exciting the fields of the motors before current can be admitted to their armatures.

A further object is to provide means for reducing the intensity of the motor fields in order to increase the motor speed above the normal one for light loads; and to these ends my invention consists in a generator and two or more motor whose fields are energized by a circuit separate from their armature circuits and means for connecting the armature circuits of any or all of the motors with the armature circuit of the generator, whereby the potential of the current supplied to each motor armature can be varied separately.

It further consists in a generator, means for varying the current supplied to its field, two or more motors whose fields are excited by a current of constant potential, and means for connecting the armature circuits of any or all of the motors with the armature circuit of the generator, whereby such of the motors as are coupled to the generator may be started and run at any desired speed and stopped by varying the field excitement of the generator.

It further consists in a generator, means for varying the current supplied to its field, two or more motors whose fields are excited from a circuit independent of their armature circuit, and a rheostat switch for the armature circuit of each motor, whereby the current to each motor armature can be modified or reversed, and the direction and speed of rotation controlled, and it further consists in a generator, a rheostat for varying the current supplied to its field, two or more motors, a source of supply for the motor fields, a switch for each motor, that connects its armature circuit with the generator armature and means for admitting constant potential current to the motor fields and to the generator rheostat so that no current can be transmitted to the motors until their fields have been energized.

It further consists in interlocking the switch for supplying current to the generator field with the switch for supplying current to the motor field, so that the generator field cannot receive current until current has been supplied to the motor field and so that current cannot be cut off from the motor field until after it has been cut off from the generator field.

It further consists in a rheostat switch for admitting current to the motor field whereby the current may be gradually cut off so as to diminish the induced current on breaking the field circuit and thus lessen the danger of breaking down the field insulation.

It further consists in so arranging the interlocking device for the motor field rheostat that the motor field can be weakened to a predetermined amount without interfering with the action of the generator rheostat so that for light loads the motor speeds may be materially increased over their normal speeds.

Figure 2:
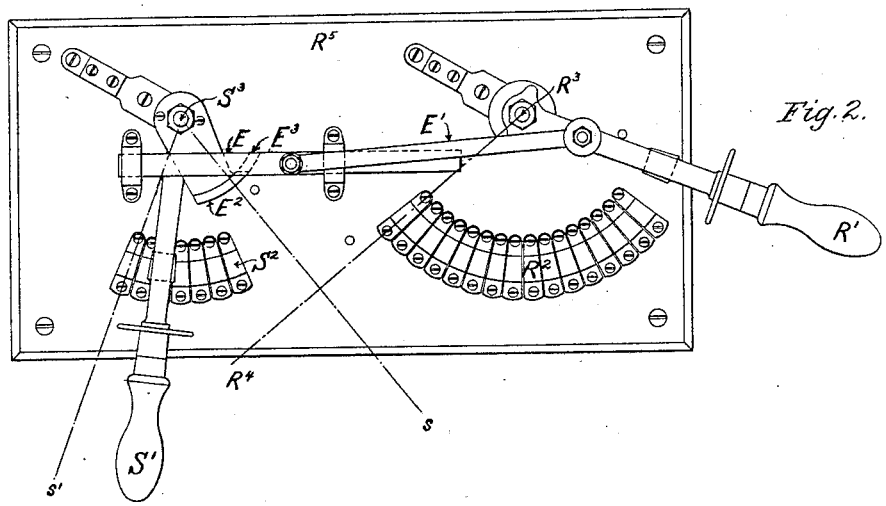
Figure 3:
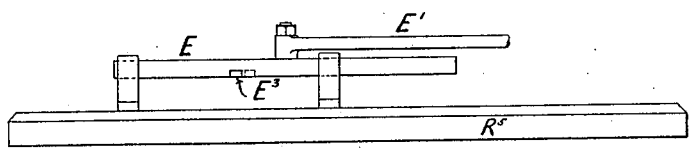
Figure 4:
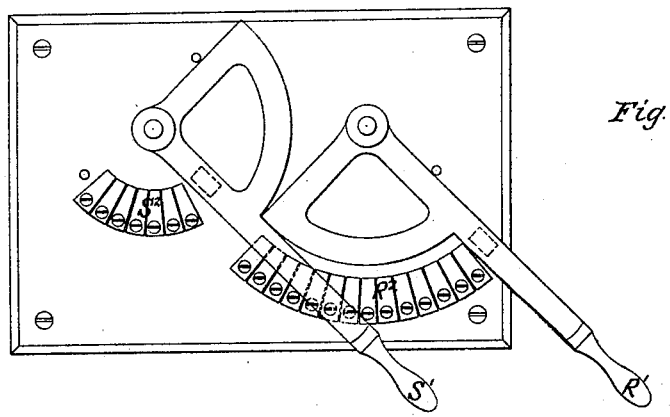
Figure 5:
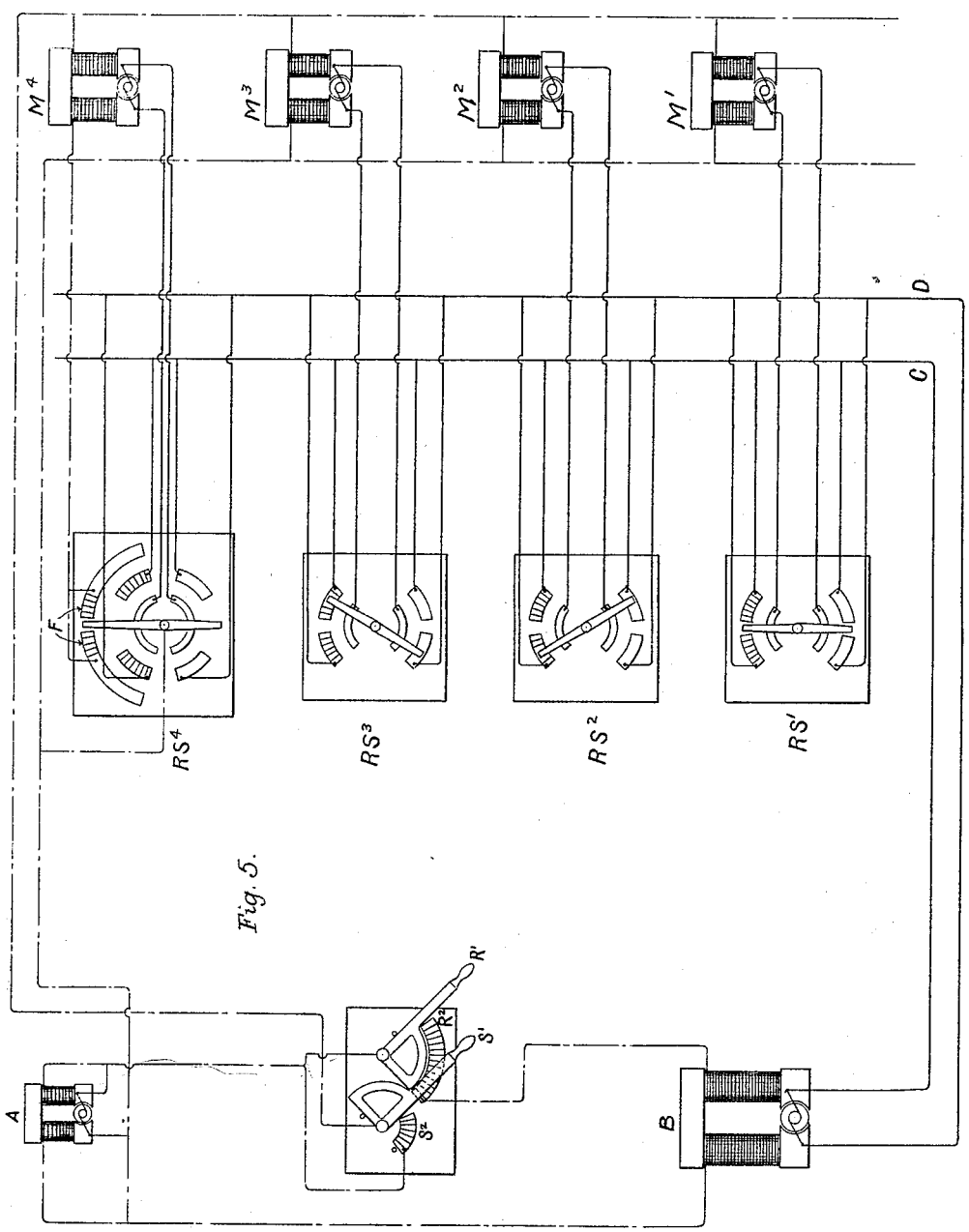

In the accompanying drawings which form part of this specification, Figure 1, Sheet 1, shows an arrangement of my method of operating two or more motors, in which one motor armature is shown ready to run forward, another ready to run backward, and another ready to be started in either direction. Fig. 2, Sheet 2, is a plan view of an interlocking arrangement of a rheostat switch for the generator field and a rheostat switch for the motor fields. Fig. 3, is a front elevation of some of the parts shown in Fig. 2; the resistance coils of the rheostats are not shown. Fig. 4, shows another method of interlocking the switch levers. Fig. 5, Sheet 3, shows an arrangement of my method of operating two or more motors, with an interlocking switch for the field circuits.

A represents a shunt or compound generator adapted to supply current of constant potential to the field of the generator B and to the fields of the motors M′ M² M³, &c.

B is a larger generator of the shunt or compound type of winding, but without any connection between the field shunt coils and armature coils.

M′, M², M³, &c., represent motors of the shunt type, the shunt coils being supplied by the generator A and having no electrical connection with the armature circuits which are supplied with current from the armature of the generator B.

RS′, RS², RS³, &c., are reversing rheostat switches, by which the direction of flow of current in the armature coils of the motor to which they are individually coupled, may be reversed and through the rheostat coils of which, the current may be gradually admitted or cut off, to start or reduce the speed, or to stop the motor if the current is in the mains and the other motors are running.

R Fig. 1 is a rheostat which admits, modifies or cuts off the current from the generator A to the field coils of the generator B and by which the voltage of the current produced by the armature of the generator B is varied from the maximum to zero.

S is a switch which cuts off the current supplied from the generator A and is so placed that when this switch is closed by moving the operating lever S R to the left, see Fig. 1 the current is admitted to the fields of the motors M′, M², and M³ and further movement of the lever S R to the left admits current to the rheostat R that regulates the field of the generator B, and as the generator B, can supply no current unless its field is excited, it will hence be impossible to send a current through the armature of the motors until current has been admitted to their fields. It is desirable as hereinbefore shown, to provide the switch, that cuts off the current from the motor fields, with a rheostat, whereby the flow can be gradually reduced and so greatly diminish the induced current at final breaking. It is also desirable to arrange the field switch for the motors so that these fields can be weakened to a predetermined extent in order to increase the motor speeds for light loads. I therefore prefer to interlock these two switches and I will now describe a method of doing this.

R′ Fig. 2, represents the lever for operating the rheostat R for the generator field. This lever is pivoted at R³ to the base plate R⁵.

R² represents the successive blocks through contact with which the amount of resistance is varied, the lever R′ being in its extreme position to the right, contact is broken and no current flows, the broken line R³ R⁴ represents its extreme position to the left when the resistance is cut out and full current flows.

S′ represents the lever for admitting current to the motor fields and is shown pivoted at S³ to the base plate R⁵; S² being the series of rheostat blocks through which the motor field current is gradually admitted or cut off, this lever S′ when all current is cut off stands in the position shown by the broken line S³ s and when the resistance of the rheostat, is cut out and full current passes to the motor fields it stands in the position of the line S³ s′. The bar E slides in suitable guides as shown, and is coupled by the connecting rod E′ to the lever R′ so as to slide back and forth in its guides, as the lever R′ is moved; the lever S′ has formed with, or secured to it, the segment E² which engages in a groove E³ formed in the bar E so that the bar and consequently the lever R′ cannot be moved until the lever S′ has been moved far enough to the left to draw the segment E² out of the groove E³ in the position shown in the drawings. When this has been done, current will have been admitted to the motor fields through the rheostat S², the lever R′ can now be moved toward the left to gradually admit current to the field coils of the generator, but it will be observed that when the lever R′ has been moved so as to admit current through the first block of the rheostat R², the groove E³ no longer corresponds with the path of the segment E² and that the lever S′ cannot be moved back, and that current cannot be cut off from the motor fields until the lever R' has been moved to its extreme position cutting off all current. The segment E² is shown as drawn out of the groove E³ before the lever S' has reached its extreme position where it admits full current to the fields, this enables me by properly arranging the rheostat S² and the length of the segment E² to put a certain resistance in the field circuit, and thereby to weaken the field coils of the motors to a predetermined amount, and thus to have the ability to increase their speed above the normal, when working with light loads. By placing the levers R' and S' as shown in Fig. 4, the bar E may be omitted, the projections from the levers forming the interlock. If there is no necessity for weakening the fields of the motors to increase their speed of rotation, then the two switches may be interlocked by combining them on one lever so that the first part of the motion will gradually introduce the current to the motor fields and when this is fully admitted, further motion will introduce the current to the generator armature through the rheostat, the current to the fields being maintained through properly arranged contact strips, as indicated in Fig. 1.

Fig. 5, Sheet 3, shows the connections from the constant potential generator A through the interlocking switch to the fields of the motors and generator B through their respective switches or rheostats.

The operation of the arrangement is as follows:—The armatures of the two generators A and B are driven continuously from any convenient source of power, the generator A producing a current of the potential due to its winding and speed, the switch S being open, the armature of the generator B runs idly, producing no current, and the motors M' M² M³, &c., are idle there being no current in their fields or armatures. The rheostat R being open, the closing of the switch S or moving of the lever S' of the rheostat, depending upon which system is used, admits current from the generator A to the field coils of all the motors, bringing them up to their full magnetic strength, and admitting current to the rheostat R. Suppose for example, that the rheostat switch RS² is now moved so as to connect the motor M² with the mains C and D connecting the positive wire with the right hand brush, and that the rheostat switch RS³ is moved say in the opposite direction to couple the motor M³ with the mains, the right hand brush being connected with the negative wire. The motors M² and M³ would now be ready to run but in opposite directions as soon as they receive current through their armatures. This is accomplished by moving the lever SR of the rheostat R in Fig. 1 or R' in Fig. 5, which admits current from the generator A to the field coils of the generator B, first through the full resistance of the rheostat R, and thus slightly magnetizes the field coils, the armature will now begin to produce a current of low voltage, which passing through the armatures of the motors M² and M³ will produce slow rotation, in opposite directions, as the rheostat R is moved to reduce its resistance, the amount of current flowing through the generator field coils increases, the voltage of the produced current rises, and the motors increase their speed and attain their maximum when the rheostat R is moved so as to allow the full current to flow through the field coils. If it is now desired to start the motor M' or any succeeding one in the group, the corresponding rheostat switch is moved to the right or left depending on the direction of rotation required, and current from the mains C D is thus admitted to the motor armature, producing rotation, which is gradually accelerated as the resistance of the rheostat is cut out, until the motor attains the full speed due to the potential existing at the time in the mains C D. If it is desired to stop any motor of the series, the rheostat switch of that motor is turned toward its central position, so as to gradually introduce more and more resistance, cutting down the potential of the current at the motor brushes and slowing the motor until the current is cut off. It will be seen that when the system is at rest and it is desired to start any motors, the rheostat switches are then moved promptly to their full extent in either direction according to the direction of rotation required and then act as ordinary switches being moved before the current is admitted and if it is never desired to start any motor while the other motors are running the rheostat can be omitted and plain reversing switches used. These require certain safeguards for their operation, which form the subject of another application for a patent. It will be seen that this arrangement has the advantage of running one or more motors at any speed for any length of time and with an expenditure of energy in proportion to the useful work done, the number of speeds that can be obtained depending upon the number of steps in the generator rheostat. It also admits of any motors being added to, or taken from, the running group without any interference with the others, and thus enables any machinery, requiring a group of motors to drive its various movements, to be operated to the best advantage and the greatest economy of both installation and operation. If the number of motors to be operated by this system is very large it may be necessary to provide additional switches so that the current may be turned into the fields of only those motors that it is desired to run, in order to reduce the amount of current consumed; the rheostat switches may be arranged so as to admit the constant potential current first to the field of each motor before admitting the other or variable current to the armature, as indicated in R S⁴ Figs. 1 and 5 where the armature rheostat blocks are moved apart and a set of field rheostat blocks F inserted with a gap between them, so that as the rheostat lever is moved either right or left, it first makes connection with the field circuit and charges the motor field and afterward admits the armature current. The generator rheostat may be made reversing so as to change the polarity of the generator field and thus to reverse the current and the direction of rotation of the motors. This is the ordinary and most convenient method where but one motor is to be operated from the generator, but might be confusing where several motors are to be operated at once and not in the same direction.

I do not limit myself to any particular form of switch, rheostat, or rheostat switch, as a great variety of forms may be arranged to accomplish the results described.

What I claim as new, and desire to secure by Letters Patent, is—

1. Two or more motors, the fields of which are excited by a current of constant potential and their armatures operated from a separate generator producing a current the potential of which may be varied, a reversing rheostat switch for the armature circuit of each motor and means whereby the motor fields are supplied with current in advance of the field of the generator that produces the current for the motor armatures.

2. Two or more motors, the fields of which are excited by a current of constant potential, and their armatures operated from a separate generator producing a current the potential of which may be varied, a reversing rheostat switch for the armature circuit of each motor, a switch to admit current to the motor fields, a switch to admit current to the generator field, and means for interlocking these two switches.

3. Two or more motors the fields of which are excited by a current of constant potential and their armatures operated from a separate generator producing a current the potential of which may be varied, a rheostat switch for the field circuit of each motor, a rheostat switch for the armature circuit of each motor, and mechanism connecting these two switches through which they are operated in proper sequence.

4. A rheostat switch that regulates the admission of current to the field of a generator, a rheostat switch that admits current of a constant potential to the field of a motor, in combination with an interlocking device between the two switch levers.

5. A rheostat switch that regulates the admission of current to the field of a generator, a rheostat switch that admits current of a constant potential to the field of a motor in combination with an interlocking device provided with an interval which unlocks the first lever before the second has completed its full motion.

J. SELLERS BANCROFT.

Witnesses:
F. M. HUTCHINSON,
E. R. HARPER.